United States Patent [19]

Hirota et al.

[11] Patent Number: 4,972,133

[45] Date of Patent: Nov. 20, 1990

[54] FAIL-SAFE MEANS FOR ELECTRICAL POWER STEERING

[75] Inventors: Fumiaki Hirota, Toyota; Takehiko Fushimi, Kariya, both of Japan

[73] Assignee: Aisin Seiki Kabushiki Kaisha, Kariya, Japan

[21] Appl. No.: 408,279

[22] Filed: Sep. 18, 1989

[30] Foreign Application Priority Data

Sep. 19, 1988 [JP] Japan .................................. 63-234185

[51] Int. Cl.$^5$ .............................................. B62D 5/04
[52] U.S. Cl. .................................... 318/646; 318/293; 318/432; 180/142; 180/79.1; 361/23
[58] Field of Search ................... 318/430–436, 318/280–293, 646; 180/79, 140, 141, 142, 143; 364/424; 361/23–34; 307/9.1, 10.1

[56] References Cited

U.S. PATENT DOCUMENTS

| | | | |
|---|---|---|---|
| 4,518,055 | 5/1985 | Yagi et al. | 180/142 |
| 4,538,698 | 9/1985 | Hashimoto et al. | 180/142 X |
| 4,651,840 | 3/1987 | Shimizu et al. | 180/142 X |
| 4,715,463 | 12/1987 | Shimizu | 180/142 X |
| 4,719,396 | 1/1988 | Shimizu | 318/293 X |
| 4,735,271 | 4/1988 | Shimizu | 318/432 X |
| 4,754,829 | 7/1988 | Shimizu | 180/142 X |
| 4,765,426 | 8/1988 | Shimizu | 318/293 X |
| 4,819,170 | 4/1989 | Shimizu | 180/142 X |
| 4,834,201 | 5/1989 | Miyazaki et al. | 180/142 X |

Primary Examiner—William M. Shoop, Jr.
Assistant Examiner—Paul Ip
Attorney, Agent, or Firm—Burns, Doane, Swecker & Mathis

[57] ABSTRACT

A fail-safe arrangement for an electrical power steering system is directed to providing a control arrangement for a power steering motor which will prevent abnormal operation from having adverse impact. The control system detects the welding or sticking together of closed relay contacs and functions to prevent such a situation by monitoring the motor terminal voltage so as to cut off power above a predetermined value regardless of position of the relay contacts.

6 Claims, 7 Drawing Sheets

FAIL-SAFE MEANS FOR ELECTRICAL POWER STEERING

BACKGROUND OF THE INVENTION

1. Field of the Invention

This invention relates to an automobile steering device; and more particularly, to power steering with fail-safe torque assistance provided by an electric motor.

2. Description of the Related Art

Conventional electrical power steering devices are often provided with a fail-safe relay in series with the power steering motor. When the motor draws too much current, the relay is opened to stop the flow of electricity to the motor. This type of fail-safe means is referred to in Japanese Patent Laid-Open Publication No. 62-292574.

During the normal operation of this type of power steering system, the relay will be closed. Under certain circumstances the current through the motor may increase so quickly that the relay cannot open fast enough to prevent its contacts from becoming welded together. Once they are welded closed, the contacts cannot be reopened.

Although the welding together of closed relay contacts rarely creates a safety hazard, it is preferable to have such an abnormal event, or fault condition, detected and reported so that the relay may be immediately repaired.

SUMMARY OF THE INVENTION

The present invention is designed to solve these problems for conventional electric power steering systems. The object is to provide a fail-safe means for detecting and reporting the welding together of closed relay contacts.

In order to meet these requirements the motor terminal voltage is sensed by a voltage detecting means. When that voltage exceeds a given value, a power cut-off means orders the motor driving circuit to stop the supply of current to the motor in spite of the position (open or closed) of the relay contacts.

When the relay contacts become welded together they will remain closed even through an opening instruction may have ordered them to be open. While the contacts are welded closed, any voltage between the motor connectors can be sensed by the voltage detecting means. If that voltage is too large, a power cut-off mechanism rather than the opening instruction will stop the power supply to the motor.

When the power supplied to the motor is stopped, the power steering system is not able to generate any auxiliary steering torque. When this happens, the steering wheel will become hard to turn and the driver will be apprised of a fault condition in the steering system by the difficulty in turning the steering. In this way, the welding together of the relay contacts can be detected by the driver.

DETAILED DESCRIPTION OF THE PREFERRED EMBODIMENTS

Figure 1:
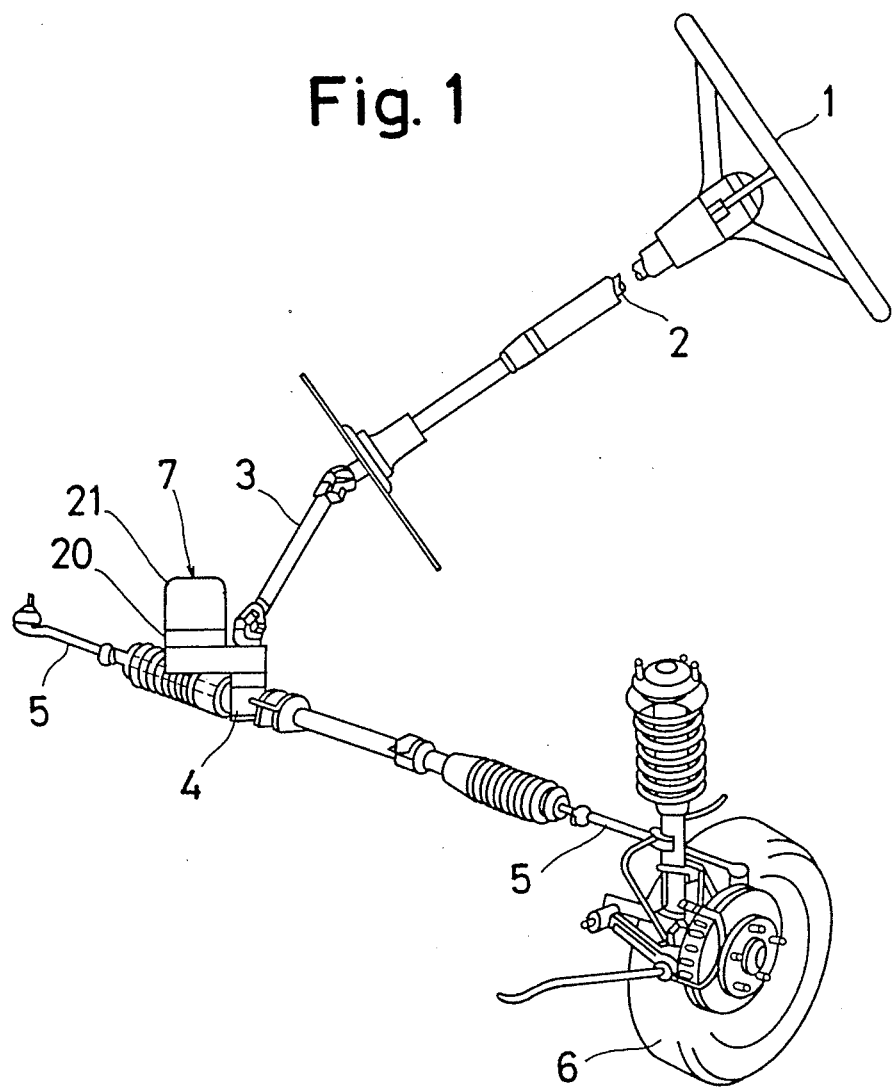
FIG. 1 is a schematic illustration of one embodiment of the present invention.

FIG. 1 schematically illustrates one preferred embodiment for the steering mechanism of the present invention. Steering wheel 1 is operated by the vehicle driver and connected to first steering shaft 2 which is in turn connected to second steering shaft 3. A rack and pinion mechanism 4 is connected to the other end of the second steering shaft 3. A rotation of steering wheel 1 will be transmitted to rack and pinion mechanism 4 through first and second steering shafts 1 and 2. Rack and pinion mechanism 4 then moves tie rod 5 in order to change the direction of wheel 6.

Figure 2:
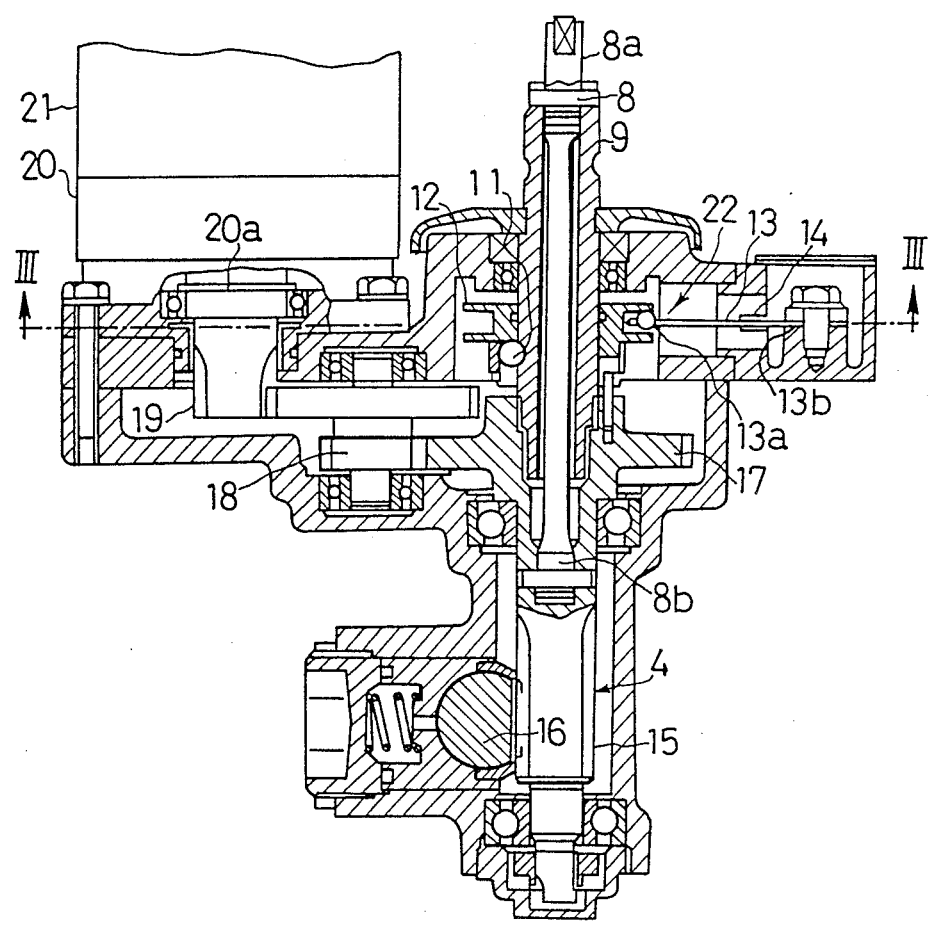
FIG. 2 is a vertical cross section II—II of FIG. 3.

FIG. 2 illustrates in detail electrical driving mechanism 7 which is mounted between second steering shaft 3 and rack and pinion mechanism 4. One end 8a of torsion bar 8 is connected to the second steering shaft 3. The other end 8b of torsion bar 8 is connected to rack and pinion mechanism 4. A rotation of second steering shaft 3 causes pinion 15 to rotate through torsion bar 8. The rotation of pinion 15 then causes rack 16 to move. Since descriptions of similar rack and pinion mechanisms are known, further description will be omitted here.

When the driver turns steering wheel 1, torsion bar 8 will be twisted in proportion to the steering torque applied to the steering wheel. This steering wheel torque is generated by friction between the wheel 6 and the road surface. For example, wheels on asphalt require less steering torque than wheels on ice.

Figure 3:
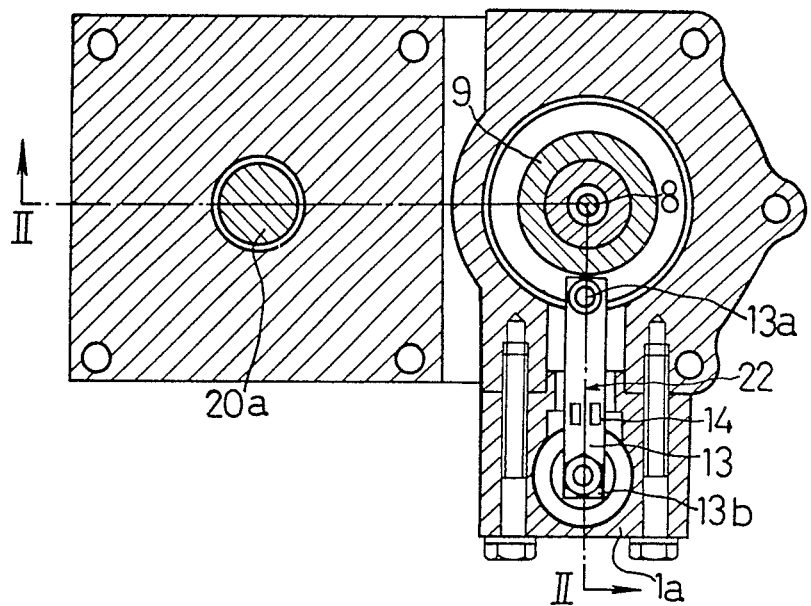
FIG. 3 is a horizontal cross section III—III of FIG. 2.
Figure 4:
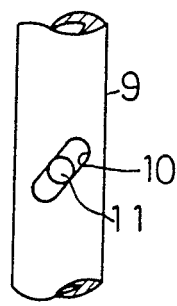
FIG. 4 is a schematic elevation of the exterior side of sleeve 30 shown in FIG. 2 and FIG. 3.

The magnitude of the steering torque is transformed into a electrical signal by a torque measurement mechanism 22. The torque measurement mechanism 22 includes a mechanism to transform the rotation, or twirl, of torsion bar 8 into an axial displacement (see FIG. 4) and also includes a mechanism to transform that axial displacement into an electrical signal (see FIG. 3).

A sleeve 9 is mounted on the end 8a of torsion bar 8. Gear 17 is mounted on the other end 8b of the torsion bar 8. An axial displacement component 12 is inserted around sleeve 9 so that it can move freely along the axial direction of torsion bar 8. The axial displacement component 12 and gear 17 form an integral component and turn together.

An oblique slot 10 is cut into sleeve 9. A ball element 11 is inserted into the slot 10. Ball 11 is fitted on the axial displacement component 12 so that when torsion bar 8 is twisted, the axial displacement component 12 moves in proportion to the rotation of torsion bar 8.

Cantilever 13 is mounted with one end 13a on axial displacement component 12 and its other end 13b on housing 7a. Consequently, if axial displacement component 12 is displaced, then the cantilever 13 will be deflected a similar amount. This deflection is transformed into an electrical signal by strain gauge 14 which is adhered to the cantilever 13. The electrical signal transformed from the strain gauge 14 will then be in proportion to the amount of steering torque applied to the steering wheel.

Gear 17 is mounted on torsion bar 8 next to pinion 15. Gear 17 meshes with reduction gears 18 and 19. Reduction gear 19 is then attached or connected to output shaft 20a of electromagnetic clutch 20.

Electro-magnetic clutch 20 intermittently engages motor 21 with reduction gear 19. Only when the motor 21 and reduction gear 19 are engaged through electromagnetic clutch 20 can the rotation of the motor 21 can be transmitted to the pinion 15. Since electro-magnetic clutches are generally known, further description will be omitted here.

Figure 5:
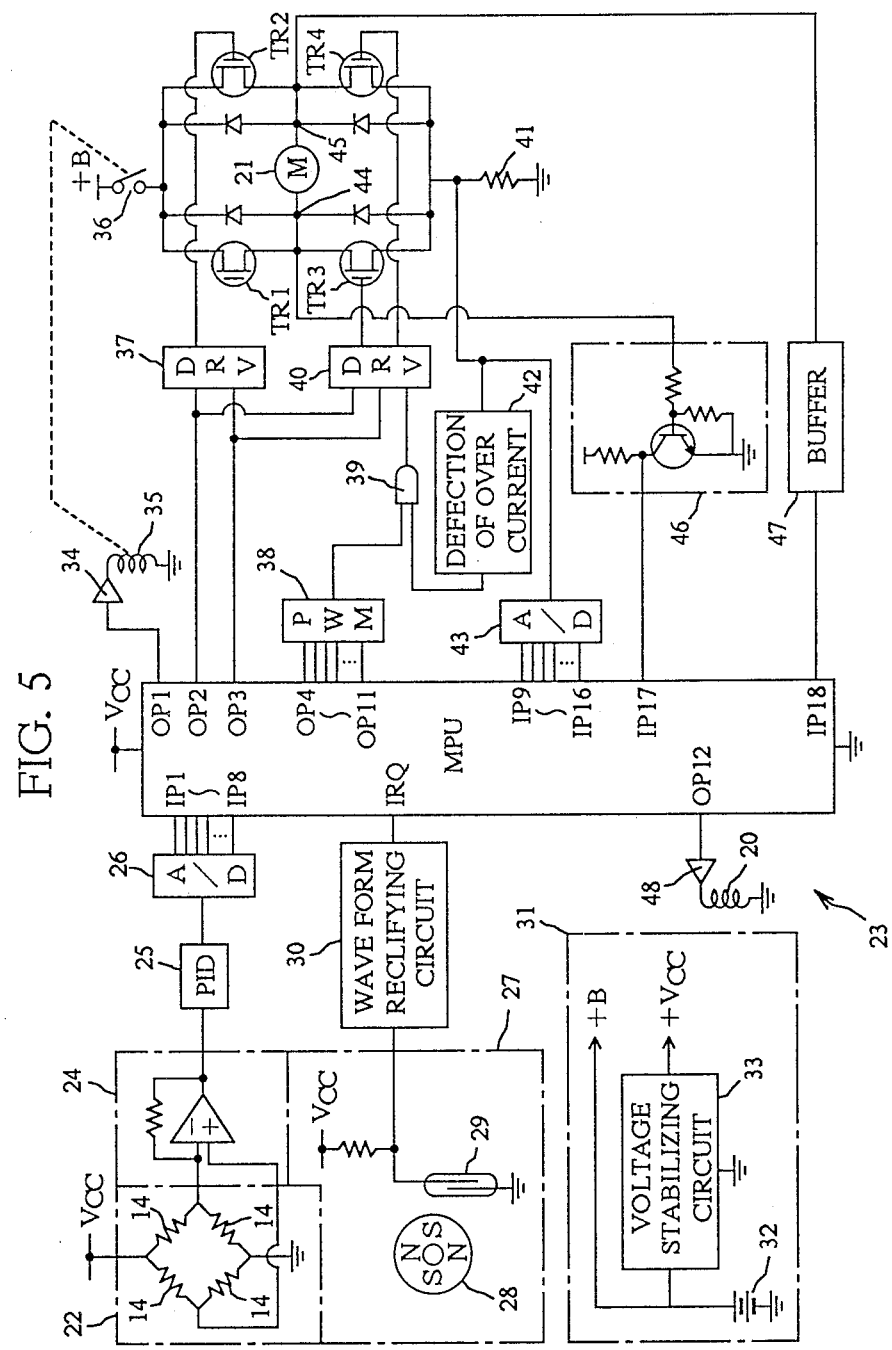
FIG. 5 is a block diagram of the control circuit for one embodiment of this invention.

Electrical driving mechanism 7 is driven by a special control circuit 23 having fail-safe capabilities. FIG. 5 illustrates one possible configuration for control circuit 23.

Microprocessor MPU is the main component of control circuit 23. Electric power for control circuit 23 is supplied by power circuit 31. The power circuit 31 is, in turn, supplied by battery 32. Battery 32 is connected with a voltage stabilizing circuit which supplies a 5 volt direct current Vcc and a 12 volt direct current +B to microprocessor MPU and its peripheral circuits.

The steering torque is transformed into an electrical signal by a torque measurement mechanism 22. The resulting electrical signal is then amplified by amplifying circuit 24 and input to differential circuit 25. The differential circuit 25 corrects the time lag of the torque measurement mechanism 22 using differential characteristics and filters electrical noise and mechanical vibration from the torque measurement mechanism 22 using integration characteristics. This processed electrical signal representing steering torque is then converted into an 8 bit digital signal by an analogue to digital, or A/D, converting circuit 26. From the A/D converting circuit 26, the signal is then input to microprocessor MPU through input ports IP1–IP8.

Figure 6:
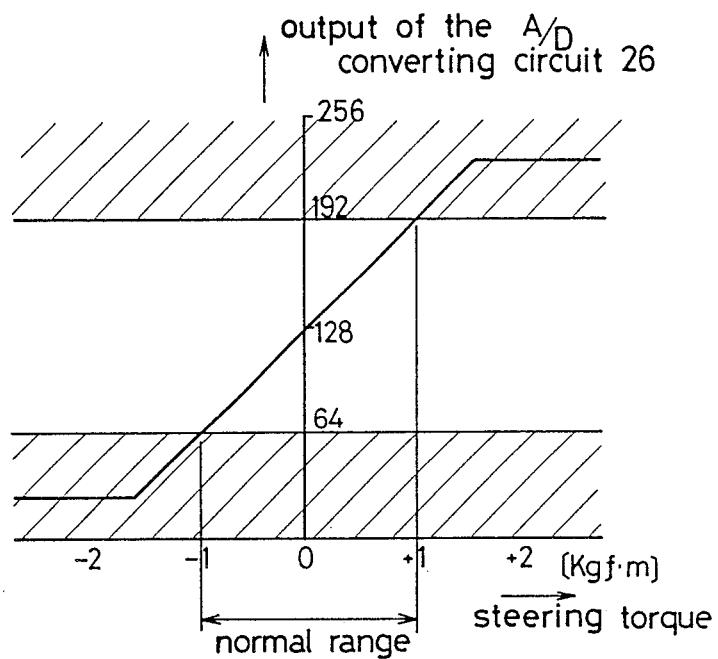
FIG. 6 is a characteristic diagram illustrating the relationship between steering torque and data input to the microprocessor.

The characteristic relationship between steering torque and input to the microprocessor MPU is illustrated in FIG. 6. For all running conditions in experimental vehicles using this device, the steering torque measured should not exceed a range of ±1 Nm. If the measured steering torque should fall outside this normal range of ±1 Nm, the torque measurement mechanism 22 is considered to be faulty.

A speed measurement mechanism 27 generates time interval electrical pulses to correspond with vehicle speed. The speed measurement mechanism 27 utilizes a permanent magnet 28 which is integrally attached to the rotating output shaft of the transmission (not shown in the figure) and a reed switch 29 located near the permanent magnet 28. Sensors of this kind have been disclosed in many other references so that a detailed description may be omitted here.

When permanent magnet 28 rotates, the reed switch 29 intermittently opens and closes to generate electrical pulses. These electrical pulses generated by the reed switch 29 are converted into square waves by a wave form rectifying circuit 30 and then input to the interrupt request terminal IRQ of microprocessor MPU.

Inside microprocessor MPU, there is an internal clock, and an interrupt program (not shown in the figure). The interrupt program measures the time interval between the electrical pulses input to the interrupt request terminal IRQ. It compares them to the time measured by the internal clock, calculates the reciprocal of the time interval, and then outputs the speed.

A relay driver 34 is connected to the output port of the microprocessor MPU. When relay driver 34 supplies current to a solenoid 35, relay 36 is closed. In the following description, current passing through solenoid 35 causing relay 36 to close is referred to as "relay on", and a lack of current to solenoid 35 so that relay 36 is open is referred to as "relay off".

A driving circuit 37 is connected to output ports OP2 and OP3 of the microprocessor MPU. Depending on the states of output ports OP2 and OP3, driving circuit 37 sets up certain field effect transistors as "on circuit". The driving circuit 37 also utilizes a voltage rising circuit to apply an external voltage of about 20 volts to the gate terminals of field effect transistors TR1 and TR2. The characteristics for driving circuit 37 are shown in Table 1.

TABLE 1

| Characteristics for Driving Circuit 37 | | | | |
|---|---|---|---|---|
| OP2 | OP3 | TR1 | TR2 | REFERENCES |
| High | High | OFF | OFF | STOP |
| High | Low | ON | OFF | RIGHT ROTATING |
| Low | High | OFF | ON | LEFT ROTATING |
| Low | Low | OFF | OFF | UNUSED |

Figure 7:
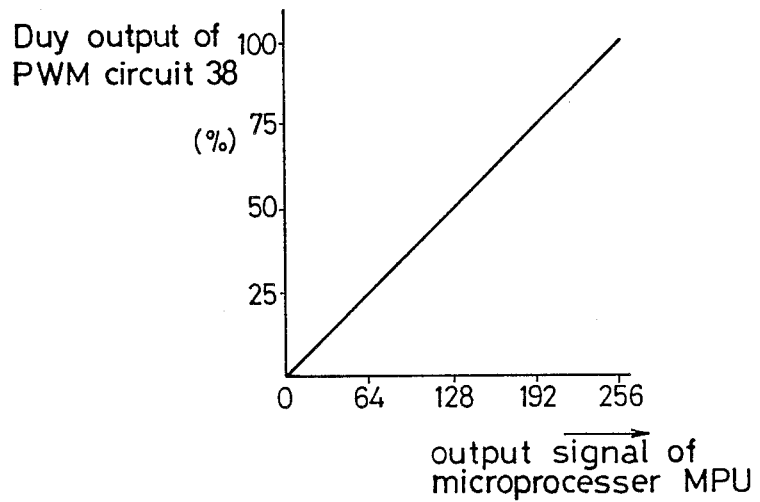
FIG. 7 is a characteristic diagram illustrating the relationship between the duty output of PWM circuit and the output signal from the microprocessor.

A PWM (Pulse Width Modulation) circuit 38 is connected to the output ports OP4–OP11 of the microprocessor MPU. Depending on the output signal from output ports OP4–OP11, the PWM circuit 38 generates square wave pulses with spacing ratios as shown in FIG. 7. These square wave pulses generated by the PWM circuit 38 are then transmitted to driving circuit 40 through AND gate 39.

Driving circuit 40 supplies an output signal to field effect transistors TR3 and TR4, and to AND gate 39 depending on the output states of output ports OP2 and OP3. The characteristics for driving circuit 40 are shown in Table 2.

TABLE 2

| Characteristics for Driving Circuit 40 | | | | |
|---|---|---|---|---|
| OP2 | OP3 | TR3 | TR4 | REFERENCES |
| High | High | OFF | OFF | STOP |
| High | Low | OFF | * | RIGHT ROTATING |
| Low | High | * | OFF | LEFT ROTATING |
| Low | Low | OFF | OFF | UNUSED |

*represents ON/OFF following the output of the AND gate 39

As depicted in Tables 1 and 2, by selecting the states of output ports OP2 and OP3, microprocessor MPU can dictate the direction of rotation for motor 21. In addition, by setting the states of output ports OP-4–OP11, the microprocessor MPU can determine the magnitude of auxiliary torque generated by the motor 21.

The current flowing through motor 21 is converted into a voltage by means of resistor 41 which has a small resistance value. This voltage is then transmitted to an over-current checking circuit 42.

The characteristics of the over-current checking circuit 42 are shown in Table 3. The over-current checking circuit 42 sets AND gate 29 in a low, or off, state when the current flowing through the motor 21 exceeds a nominal value and field effect transistors TR3, TR4 are OFF. Unless, there is a failure detected in the over-current checking circuit 42, the current flowing through motor 21 should never exceed a nominal value.

TABLE 3

| Characteristics of Over-Current Checking Circuit 42 | |
|---|---|
| Value of current checked | Output |
| Within the normal range | High |
| Over current | Low |

Figure 8:
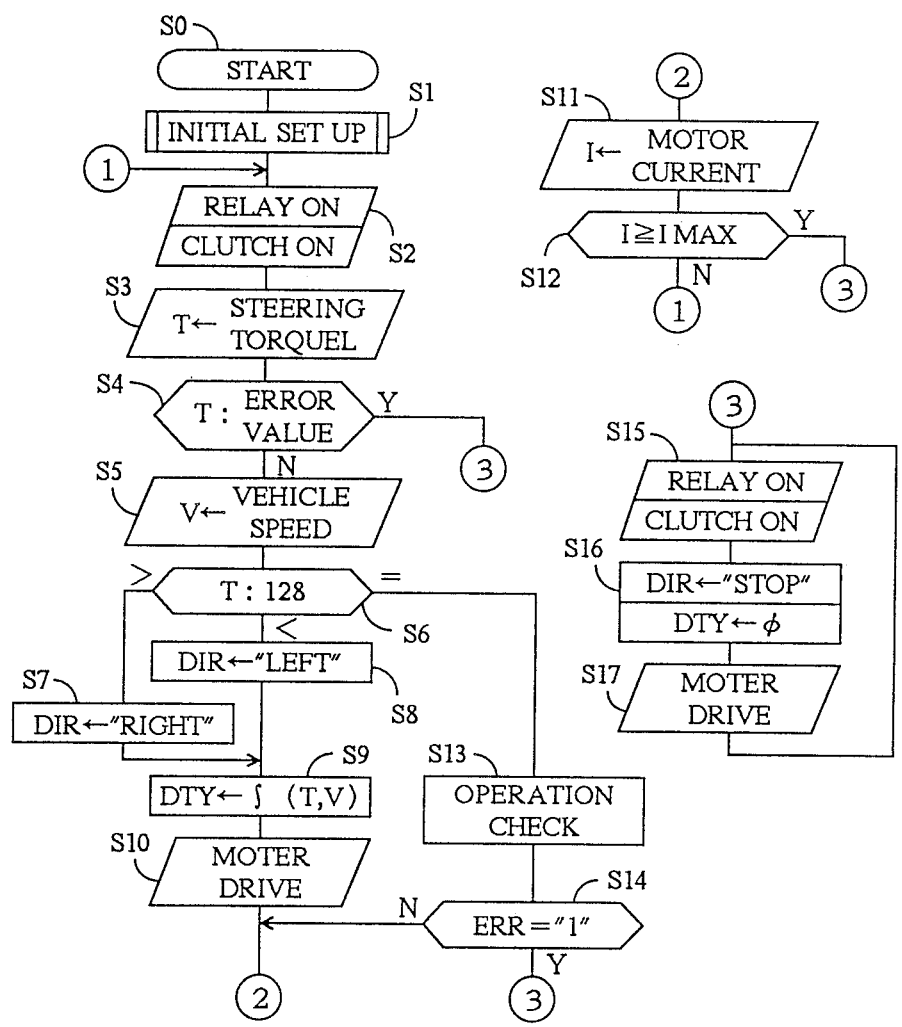
FIG. 8 is a flow chart illustrating the program steps executed by the microprocessor.

The voltage across resistance 41 is transformed into an 8 bit digital signal by analogue to digital convertor 43 and input to the microprocessor MPU through input ports IP9-IP16. Microprocessor MPU is programed so that when current flowing through the motor 21 exceeds a nominal value in large scale, relay contact 36 opens to disengage the electro-magnetic clutch 20 through clutch driver 48. The following description of this program will refer to FIG. 8.

The voltage on connectors 44 and 45 is input to the microprocessor MPU through input ports IP17 and IP18 via input buffers 46 and 47. Microprocessor MPU is programmed to monitor the voltage between connectors 44 and 45 of motor 21. Microprocessor MPU also monitors the condition of the contacts for relay 36 and identifies whether or not field effect transistors TR1 and TR2 are in a normal state. These functions are illustrates in FIG. 9.

When battery 32 is connected to the control circuit 23, microprocessor MPU begins to execute the control flow SO. The control flow SO includes three main parts, S1-S12, S15-S17, and S13-S14. The first part is composed of steps S1-12. This part of the control flow program generates a suitable auxiliary torque to correspond with the steering torque and vehicle speed. The second part is composed of steps S15-S17. This part of the program interrupts the generation of auxiliary torque by motor 21 when there is an abnormal condition in the fail-safe means. The third part is composed of steps S13 and S14. This part of the program checks the operation of field effect transistors TR1 and TR2, and relay 36 when the steering torque becomes zero.

Step S1 is the initial set up for the program. Step S2 supplies current to solenoid 35 and switches on the relay. Step 57 also supplies power to electro-magnetic clutch 20 through clutch driver 48 and couples the motor 21 to reduction gear 19.

Step S3 reads the steering torque from input ports IP1-IP8 and stores the result in register T. Step S4 identifies abnormal values of steering torque stored in the register T. If the value in the register T is in the shaded area of FIG. 6, then the operation of the torque measurement mechanism is considered to be faulty and the program branches to step S15. Step S5 stores the vehicle speed (obtained by the speed measurement mechanism and interrupt program not shown in FIG. 8) in resister V.

Step S6 decides whether steering wheel 1 is turning to the right or left. More specifically, it identifies whether or not the value in register T is greater than 128. A value of T equal to 128 signifies a zero value for steering torque. When steering wheel 1 is turned to the right, the value in the register T will be greater than 128, and step S7 will store "right" turn in register DIR. When steering wheel 1 is turned left, the value in register T will be less than 128, and step S8 will store "left" turn in register DIR. Moreover, when the value in the register T equals 128, the program will shift to step S13 and execute an operation check. Step S13 will be described later in reference to FIG. 9.

Step S9 calculates the required amount of the auxiliary torque from the steering torque stored in the register T and the speed stored in the register V. It also calculates the optimum spacing ratio for generating this auxiliary torque and stores the result in register DTY.

Step S10 sets the states of output ports OP2 and OP3 to correspond with the turning direction in register DIR. It also sets the states of output ports OP4-OP11 to correspond with the spacing ratio stored in register DTY. As step S10 is executed, the motor 21 is rotated and auxiliary torque is generated.

Step S11 reads the current flowing through motor 21 from input ports IP9-IP16 and stores the result in the register I. Step S12 decides whether the value stored in the register I is greater than Imax, where Imax is 1.2 times the nominal motor current value. When the value in the register I exceeds Imax the program branches to step S15 in order to stop the flow of current through the motor. On the other hand, if the value in register I is less than Imax, the program branches to Step S2 in order to perform the entire process again.

In the second part of control flow S0, when Steps S15-S17 detect any abnormal event, the current to motor 21 is stopped and motor 21 is separated from the reduction gear 19. Step S15 stops the supply of current to solenoid 35 which in turn opens relay 36. At the same time, the power supply to the electromagnetic clutch 20 is also stopped so that motor 21 is separated from reduction gear 19.

Step S16 stores the stopped condition of the motor 21 in register DIR and simultaneously sets register DTY to zero. Step S17 sets output ports OP2 and OP3 to correspond with the rotation condition set in register DIR. At the same time it sets the states of output ports OP4-OP11 to correspond with the spacing ratio stored in register DTY.

Steps S15-S17 are continuously executed until battery 32 is removed from the control circuit. This means when any abnormal condition is detected, motor 21 will not generate auxiliary torque until the device is once again functioning. In this way, a driver will be without power steering until the abnormal condition is repaired.

In the third part of the control flow S0, Step S13 checks the operation of field effect transistors TR1 and TR2 and relay 36. The result of that check is then stored in register ERR. Step S14 then identifies the checking results stored in the register ERR. If an abnormal event has not occurred, then the program branches to step S11. On the other hand, if an abnormal event has occurred, then the program branches to step S15 and the current supply to the motor 21 is stopped. The programming of Step S13 is actually the core of this invention and the following detailed description of that programming is provided with reference to FIG. 9.

The subprogramming of step S13 is composed of steps S31-S47. Step S31 stops the supply of current to solenoid 35 resulting in the "relay off" condition. Simultaneously, it sets the states of output ports OP4-OP11 so that the spacing ratio of the output signal of PWM circuit 38 is equal to zero percent. Step S32 then sets up the states of output ports OP2 and OP3 so that field effect transistor TR1 is "ON" and TR2 is "OFF".

Step S33 reads the voltage on connectors 44 and 45 from input ports IP17-IP18 and stores the result in the registers E1 and E2. Step S34 then decides whether registers E1 and E2 are both "High" simultaneously. If the status of the registers E1 and E2 are both "High", then the relay 36 and the transistors TR1 and TR2 are all considered to be operating normally and the program branches to step S35 is entered. If either E1 or E2 is not "High", then the failures listed in Table 4 are determined at step S34. If a failure is discovered, then the program branches to step S46 is entered and a "1" is stored in register ERR.

TABLE 4

| | Mode 1 Failures | |
|---|---|---|
| E1 | E2 | References |
| "High" | "Low" | Normal |
| "High" | "Low" | Relay contact 36 short circuit and Transistor TR4 short circuit |
| "High" | "Low" | Relay contact 36 short circuit and Transistor TR1 open circuit and Transistor TR2 short circuit and Transistor TR3 short circuit |
| "Low" | "Low" | Relay contact 36 short circuit |

Step S35 sets output ports OP2 and OP3 so that field effect transistor TR1 is "OFF" and TR2 is "ON". Step S36 reads the voltage on connectors 44 and 45 from input ports IP17 and IP18 and stores the result in the registers E1 and E2.

Step S37 decides if the status of registers E1 and E2 are both "High". If the states of the register E1 and E2 are both "High", then the contacts for relay 36 and the transistors TR1 and TR2 are all considered to be operating normally and the program proceeds to step S38. The failure listed in Table 2 can be determined by the status of the registers E1 and E2 at step S37. If it is determined that a failure has occurred, then the program proceeds to Step S46 and a "1" is stored in the ERR register.

TABLE 5

| | Mode 2 Failures | |
|---|---|---|
| E1 | E2 | References |
| "High" | "High" | Normal |
| "Low" | "High" | Relay contact 36 short circuit and Transistor TR1 short circuit and Transistor TR2 open circuit and Transistor TR4 short circuit |
| "High" | "Low" | Relay contact 36 short circuit and Transistor TR3 short circuit |
| "Low" | "Low" | Relay contact 36 short circuit |

Step S38 supplies current to the solenoid 35 in order to create the "relay on" condition and simultaneously sets the output ports OP4–OP11 so that the spacing ratio of the output signal of the PWM circuit equals zero. Step S39 sets the output ports OP2 and OP3 so that the field effect transistor TR1 is "ON" and TR2 is "OFF". Step S40 reads the voltage on connectors 44 and 45 from the input ports IP17 and IP18 and stores the result in the registers E1 and E2.

Step S41 decides whether the status of the register E1 is "LOW" while the status of the register E2 is "High". If they are, relay 36 and transistors TR1 and TR2 are all determined to be normal and the program proceeds to step S42. The failures listed in Table 6 can be determined by the states of E1 and E2 at step S41. If it is determined that a failure has occurred, then Step S46 is executed and "1" is stored in the register ERR.

TABLE 6

| | Mode 3 Failures | |
|---|---|---|
| E1 | E2 | References |
| "High" | "High" | Relay contact 36 open circuit or Transistor TR1 open circuit |
| "Low" | "High" | Transistor TR4 short circuit |
| "High" | "Low" | Transistor TR1 open circuit and Transistor TR2 short circuit and Transistor TR3 short circuit |
| "Low" | "Low" | Normal |

Step S43 sets output ports OP2 and OP3 so that the field effect transistor TR1 is "OFF" and TR2 is "ON". Step S43 reads the voltage on connectors 44 and 45 from the input ports IP17 and IP18 and stores the result in the registers E1 and E2. Step S44 decides whether the status of register E1 is "High" and register E2 is "Low". If they are, they relay 36 and transistors TR1 and TR2 are operating normally and the program proceeds to Step S45 where a "0" is entered and stored in ERR. The failures listed in Table 7 can be determined by the states of the registers E1 and E2 at Step 45. If it is determined that failure has occurred, then Step S46 is executed and a "1" is stored in register ERR. Step S47 then returns the program to step S14.

TABLE 7

| | Mode 4 Failures | |
|---|---|---|
| E1 | E2 | References |
| "High" | "High" | Relay contact 36 open circuit or Transistor TR2 open circuit |
| "Low" | "High" | Transistor TR1 short circuit and Transistor TR2 open circuit and Transistor TR4 short circuit |
| "High" | "Low" | Transistor TR3 short circuit |
| "Low" | "Low" | Normal |

Figure 9:
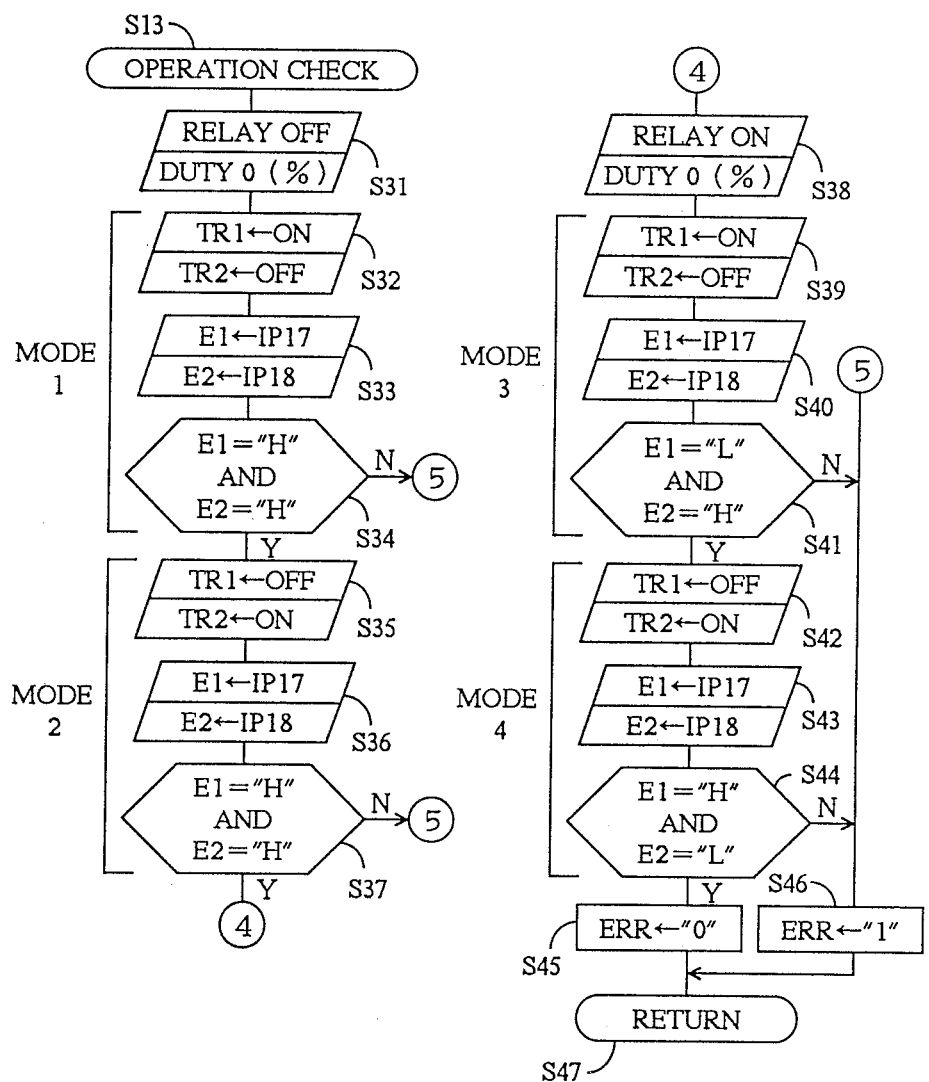
FIG. 9 is a continuation of the flow chart of FIG. 8.

When the control circuit follows the program illustrated in FIG. 9, it continues to check the operation of relay 36 and field effect transistors TRI and TR2 even when no auxiliary steering torque is needed. They are checked continuously as along as the vehicle is running and the steering wheel is not turned. Therefore, control circuit 23 can rapidly discover failures in the electrical safety means and stop the supply to the motor 21.

However, if only the current to motor 21 is stopped, motor 21 may occasionally obstruct the turning of the steering wheel. Because of this problem, at the moment a failure of the electrical safety means is detected by the control circuit 23, not only is the supply to the motor 21 is cut off; but also the supply to the electro-magnetic clutch 20 so that motor 21 is disengaged from the steering system. In this way, motor 21 will not obstruct the turning of the steering system and the safe operation of the steering wheel is maintained.

Even though this description illustrates the operations checking of the actions of the relay 36 and transistors TRI and TR2, many other problems may also be considered. For example, when the vehicle speed detected by speed measurement mechanism 27 exceeds 100 Km/hr., the operations check step S13 is reinitiated.

Since auxiliary torque is not necessary when vehicle speed exceeds 100 Km/hr, a the execution of the operations check step S13 will not cause any unsafe conditions.

The operations check may also be initiated when the vehicle is standing still. Even though the operations check may cause an unwanted condition when the vehicle is not moving, such a condition will rarely be dangerous. Moreover, the checking may be stopped just after starting the engine.

According to this invention, welding together of the relay contacts while in their closed state can be detected and reported. Also, according to the invention, the welding together of the relay contact can be detected while the vehicle is standing still. Consequently, the steering system will be safer because it will not be powered by faulty driving circuits.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

We claim:

1. A fail-safe means for an electrical power steering device comprising:
    torque detecting means for sensing a steering torque applied to a steering wheel;
    a motor for generating auxiliary torque so as to decrease the steering torque detected by the torque detecting means;
    an electro-magnetic clutch for intermittently engaging with said motor to connect said motor to said steering wheel;
    a clutch driving circuit for controlling the intermittent engagement of said clutch with said motor;
    a motor driving circuit for controlling power flowing to said motor so as to optimize the steering torque sensed by the detecting means;
    a relay having contacts in series with said motor which controls current flow through said motor;
    opening instruction means for instructing said relay to open;
    voltage detecting means for sensing voltage at connections with said motor and comparing said voltage to a desired voltage and including short circuit detecting means for detecting a short circuit in said relay; and
    power cut-off instruction means for instructing said motor driving circuit to stop supply of current to said motor when said opening instruction means orders the relay contact to be opened and said voltage detecting means senses any voltage in disparity with said desired voltage and for instructing said clutch driving circuit to disengage said clutch from said motor.

2. A fail-safe means for an electrical power steering device as claimed in claim 1, wherein said opening instruction means instructs said relay to open when said steering torque is zero.

3. A fail-safe means for an electrical power steering device as claimed in claim 1, wherein said voltage detecting means comprises:
    a resistor connected to said motor driving circuit for converting current flowing through said motor to a voltage; and
    an over-current detection circuit connected between said motor driving circuit and said resistor for detecting the voltage across said resistor and comparing the voltage to the desired voltage to determine whether the current flowing through said motor exceeds the desired value.

4. A fail-safe means for an electrical power steering device as claimed in claim 1, wherein said motor driving circuit comprises:
    a first pair of field effect transistors connected in series with each other and, at a first connection point, to a first input/output of said motor;
    a second pair of field effect transistors connected in series with each other, in parallel with said first pair of field effect transistors and, at a second connection point, to a second input/output of said motor;
    a first buffer having an output and an input connected to said first input/output of said motor for detecting the voltage at the first connection point between said first pair of field effect transistors and said motor;
    a second buffer having an output and an input connected to said second input/output of said motor for detecting the voltage at the second connection point between said first pair of field effect transistors and said motor; and
    processor means connected to said outputs of said first and second buffer for determining which, if any, of said relay and the field effect transistors in said first and second pairs of field effect transistors are malfunctioning.

5. A fail-safe means for an electrical power steering device comprising:
    torque detecting means for sensing a steering torque applied to a steering wheel;
    a motor for generating auxiliary torque so as to decrease the steering torque detected by the torque detecting means;
    a motor driving circuit for controlling power flowing to said motor to optimize the steering torque sensed by the detecting means;
    a relay having contacts in series with said motor which controls current flow through said motor;
    opening instruction means for instructing said relay to open;
    voltage detecting means for sensing voltages at connections with said motor and comparing that voltage to a desired voltage and comprising short circuit detecting means for detecting a short circuit in said relay, said voltage detecting means comprising:
        a first pair of field effect transistors connected in series with each other and, at a first connection point, to a first input/output of said motor;
        a second pair of field effect transistors connected in series with each other, in parallel with said first pair of field effect transistors and, at a second connection point, to a second input/output of said motor;
        a first buffer having an output and an input connected to said first input/output of said motor for detecting the voltage at the first connection point between said first pair of field effect transistors and said motor; and a second buffer having an output and an input connected to said second input/output of said motor for detecting the voltage at the second connection point between said first pair of field effect transistors and said motor; and processor means connected to said outputs of said first and second buffer for determining which, if any, of said relay and the field effect transistors in said first and second pairs of field effect transistors are malfunctioning; and said device further comprising:

power cut-off instruction means for instructing said motor driving circuit to stop the supply of current to said motor when said opening instruction means orders the relay contact to be opened and said voltage detecting means senses any voltage in disparity with said desired voltage.

6. A fail-safe means for an electrical power steering device as claimed in claim 5, wherein said voltage detecting means comprises:

a resistor connected to said motor driving circuit for converting current flowing through said motor to a voltage; and an over-current detection circuit connected between said motor driving circuit and said resistor for detecting the voltage across said resistor and comparing the voltage to the desired voltage to determine whether the current flowing through said motor exceeds the desired value.

* * * * *